United States Patent [19]
Durkos

[11] Patent Number: 5,904,789
[45] Date of Patent: May 18, 1999

[54] BOX SPRING STAPLER APPARATUS AND METHOD

[75] Inventor: Larry G. Durkos, Lebanon, Ind.

[73] Assignee: Imaginal Systematics, L.L.C., Lebanon, Ind.

[21] Appl. No.: 08/976,912

[22] Filed: Nov. 24, 1997

[51] Int. Cl.[6] .............................. B27F 7/17; G06K 9/20
[52] U.S. Cl. .............................. 156/64; 156/378; 227/7; 227/142; 382/141; 382/152
[58] Field of Search .................................... 382/141, 152, 382/151

[56] References Cited

U.S. PATENT DOCUMENTS

| | | | |
|---|---|---|---|
| 3,168,745 | 2/1965 | Winters | 227/39 |
| 3,190,522 | 6/1965 | Winters | 227/40 |
| 3,770,180 | 11/1973 | Stumpf | 227/48 |
| 4,995,087 | 2/1991 | Rathi et al. | 382/2 |
| 5,533,146 | 7/1996 | Iwai | 382/150 |

*Primary Examiner*—David A. Simmons
*Assistant Examiner*—Sue A. Purvis
*Attorney, Agent, or Firm*—Barnes & Thornburg

[57] ABSTRACT

An apparatus and method for securing a plurality of modules to a frame to form a box spring includes a base for supporting the frame and the modules, a support, and a drive mechanism coupled to the support and the base. The drive mechanism is configured to provide relative movement between the support and the base. The apparatus also includes a camera coupled to the support. The camera provides an image signal indicative of an actual position of the modules relative to the frame upon relative movement of the support and the base. The apparatus further includes a tool coupled to the support for securing each of the modules to the frame using the image signal from the camera.

31 Claims, 12 Drawing Sheets

BOX SPRING STAPLER APPARATUS AND METHOD

BACKGROUND AND SUMMARY OF THE INVENTION

The present invention relates to a vision guided fastener apparatus and method. More particularly, the present invention relates to a stapler apparatus for assembly of a box spring, or the like, automatically using a vision guided control.

Conventional box springs which are used to support mattresses include a wood frame which supports a plurality of spring modules spaced apart on the wood frame. The modules are coupled to a wire grid which forms the top surface of the box spring. Bottom ends of the modules are typically stapled directly to the wood frame of the box spring.

During conventional assembly of the box spring, a worker must manually staple each of the plurality of modules to the wood frame using an industrial stapler. Therefore, the manufacturing process is limited to the capability of the individual hired to staple the box spring to the modules.

The apparatus of the present invention is designed to automate the box spring stapling process. The apparatus of the present invention includes a vision guided stapling apparatus which automatically locates the modules on the wood frame and then guides the stapler into proper position to secure the modules to the wood frame automatically. The apparatus of the present invention is designed to accommodate different size box springs, such as twin, full, queen, and king sizes. In addition, the apparatus of the present invention may be programmed to secure any type of module to the wood frame of the box spring.

In one illustrated embodiment of the present invention, the apparatus includes a base having two separate sides for supporting two box springs. Therefore, the apparatus can be used to staple modules to a first wood frame on the first side while another box spring is being loaded on the second side of the base. Once the first box spring is completed, the apparatus moves over the second side to staple modules to the second wood frame while another box spring is loaded on to the first side of the apparatus.

According to one aspect of the present invention, an apparatus is provided for securing a plurality of modules to a frame to form a box spring. The apparatus includes a base for supporting the frame and the modules, a support, and a drive mechanism coupled to the support and the base. The drive mechanism is configured to provide relative movement between the support and the base. The apparatus also includes a camera coupled to the support. The camera provides an image signal indicative of an actual position of the modules relative to the frame upon relative movement of the support and the base. The apparatus further includes a tool coupled to the support for securing each of the modules to the frame using the image signal from the camera.

In the illustrated embodiment, the apparatus still further includes a controller for guiding movement of the drive mechanism relative to the base and for controlling movement of the tool to secure each of the modules to the frame as the support moves relative to the frame and the modules located on the base. The controller includes a memory for storing an optimum position for each of the modules on the frame relative to the base. The controller also includes means for guiding the tool to the stored optimum position for securing each module to the frame.

The controller receives the image signal from the camera. The illustrated controller includes means for adjusting the position of the tool from the optimum position to an actual position of the module based upon the image signal to engage the module with the tool. The controller compares the actual position of each module to the optimum position of each module stored in the memory to generate a correction signal to adjust the position of the tool and the module before the module is secured to the frame.

The controller including means for storing an image of the module in the memory, and means for storing at least one designated tool target on the module. The controller compares the image from the camera to the stored module image to control the drive mechanism to move the support and the tool. The controller includes means for calculating position error of the module relative to the frame by comparing the actual image signal from the camera to the stored module image for an optimum module position. The controller also includes means for generating a control signal to move the module to the optimum module position prior to securing the module to the frame. A modem is coupled to the controller for accessing the controller from a remote location.

Also in the illustrated embodiment, the camera is pivotably mounted to the support. The camera pivots about 10° from an initial position aligned generally perpendicular to the base. The tool is also pivotably coupled to the support. Illustratively, the tool is mounted in a gimble coupled to the support. The gimble is pivotable about a first axis and about a second axis normal to the first axis. The tool is also rotatably coupled to the support. The tool is movable from a retracted position to an extended position to engage a module and secure the module to the frame.

The illustrated apparatus includes first and second cameras coupled to the support on opposite sides of the tool. The first camera provides the image signal when the support is moving in a first direction, and the second camera provides the image signal when the support is moving in a second direction. The second camera may provide inspection for the tool when the support is moving in the first direction, and the first camera may provide inspection for the tool when the support is moving in the second direction, if desired.

The illustrated embodiment also includes a bottom gantry movable below the base. The bottom gantry includes an alignment tool configured to position the modules on the frame. The bottom gantry moves the alignment tool relative to the base using a cable drive mechanism.

In one illustrated embodiment, the base includes a first base section for supporting a first frame and a plurality of first modules, and a second base section for supporting a second frame and a plurality of second modules. The drive mechanism is configured to move the support over both the first and second base sections.

According to another aspect of the present invention, a method is provided for securing a plurality of modules to a frame to form a box spring. The method includes the steps of providing a base for supporting the frame and the modules, providing a tool for securing the modules to the frame, storing an image of an optimum position for each of the modules on the frame relative to the base, and providing relative movement between the tool and the base to move the tool to the optimum position for each module. The method further includes the steps of generating an image signal using a camera to indicate an actual position of each module relative to the frame, comparing the optimum position of the module to the actual position of the module, adjusting the position of the tool based on the comparing step, and securing the module to the frame.

The illustrated method further includes the steps of storing a plurality of different optimum positions in the memory corresponding to a plurality of different frame and module configurations, and selecting a particular frame and module configuration based upon the actual frame and module configurations that are located on the base.

The method further includes the step of determining whether the module should be moved by the tool relative to the frame based on the comparing step before the tool secures the module to the frame in the securing step. The illustrated method also includes the step of aligning the modules on the frame substantially in the optimum position prior to the securing step.

According to yet another aspect of the present invention, an apparatus is provided for securing a module to a frame. The apparatus includes a base for supporting the frame and the modules, a support including a track extending across the frame, and a first drive mechanism coupled to the support and the base. The first drive mechanism is configured to move the support along a first axis over the base. The apparatus also includes a fastener assembly including a plate movably coupled to the track of the support for movement along a second axis which is generally perpendicular to the first axis, a gimble pivotably coupled to the plate about both the first axis and the second axis, and a tool coupled to the gimble for movement about a longitudinal axis for securing the module to the frame. The apparatus further includes a second drive mechanism coupled between the support and the plate for moving the plate along the second axis relative to the support, a third drive mechanism coupled between the plate and the gimble for pivoting the gimble about the first axis, a fourth drive mechanism coupled between to the plate and the gimble for pivoting the gimble about the second axis, and a fifth drive mechanism coupled to the tool for moving the tool up and down along its longitudinal axis. The apparatus still further includes a controller coupled to and configured to actuate the first, second, third, fourth, and fifth drive mechanisms for guiding movement of the support, the plate, the gimble, and the tool to secure the module to the frame.

The illustrated apparatus further includes a camera coupled to the support. The camera provides an image signal indicative of an actual position of the module relative to the frame upon movement of the support relative to the base. The controller includes means for storing an optimum position of each module relative to the frame, means for moving the tool to the optimum position, means for comparing the optimum position to the actual position of the module based on the image signal from the camera, and means for adjusting the position of the tool to engage the module.

According to still another aspect of the present invention, an apparatus for controlling a stepper motor includes a motor driver coupled to the stepper motor. The motor driver provides an output signal to the stepper motor to index the stepper motor. The motor driver also sets a micro-step resolution for the stepper motor. The apparatus also includes a controller coupled to the motor driver. The controller transmits control data to the motor driver for instructing the motor driver whether to index the stepper motor and whether to change the micro-step resolution setting. The motor driver is configured to decode the control data received from the controller, to index the stepper motor, and to change the micro-step resolution setting during continued operation of the stepper motor.

In the illustrated embodiment, the control data includes first data for instructing the motor driver whether to change the micro-step resolution setting of the stepper motor, and second data to representing the desired new micro-step resolution setting. Also illustratively, the control data is a serial byte of data. The first data includes a first data bit, and the second data includes at least three data bits to provide a plurality of different desired the micro-step resolution settings for the stepper motor.

The controller transmits data to the motor driver at a preset period to control a micro-step rate of the stepper motor. The period is adjustable during operation of the stepper motor to change the micro-step rate of the stepper motor.

According to an additional embodiment of the present invention, an apparatus for controlling a stepper motor includes a motor driver coupled to the stepper motor. The motor driver provides an output signal to the stepper motor to index the stepper motor. The motor driver also sets a power level at which the stepper motor is operated. The apparatus also includes a controller coupled to the motor driver. The controller transmits control data to the motor driver for instructing the motor driver whether to index the stepper motor and whether to change the power level setting. The motor driver being configured to decode the control data received from the controller, to index the stepper motor, and to change the power level setting during continued operation of the stepper motor.

In the illustrated embodiment, the control data includes first data for instructing the motor driver whether to change the power level setting of the stepper motor, and second data to representing the desired new power level setting. The first data illustratively includes a first data bit, and the second data includes at least three data bits to provide a plurality of different power level settings for the stepper motor.

Additional objects, features, and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF DRAWINGS

Figure 1:
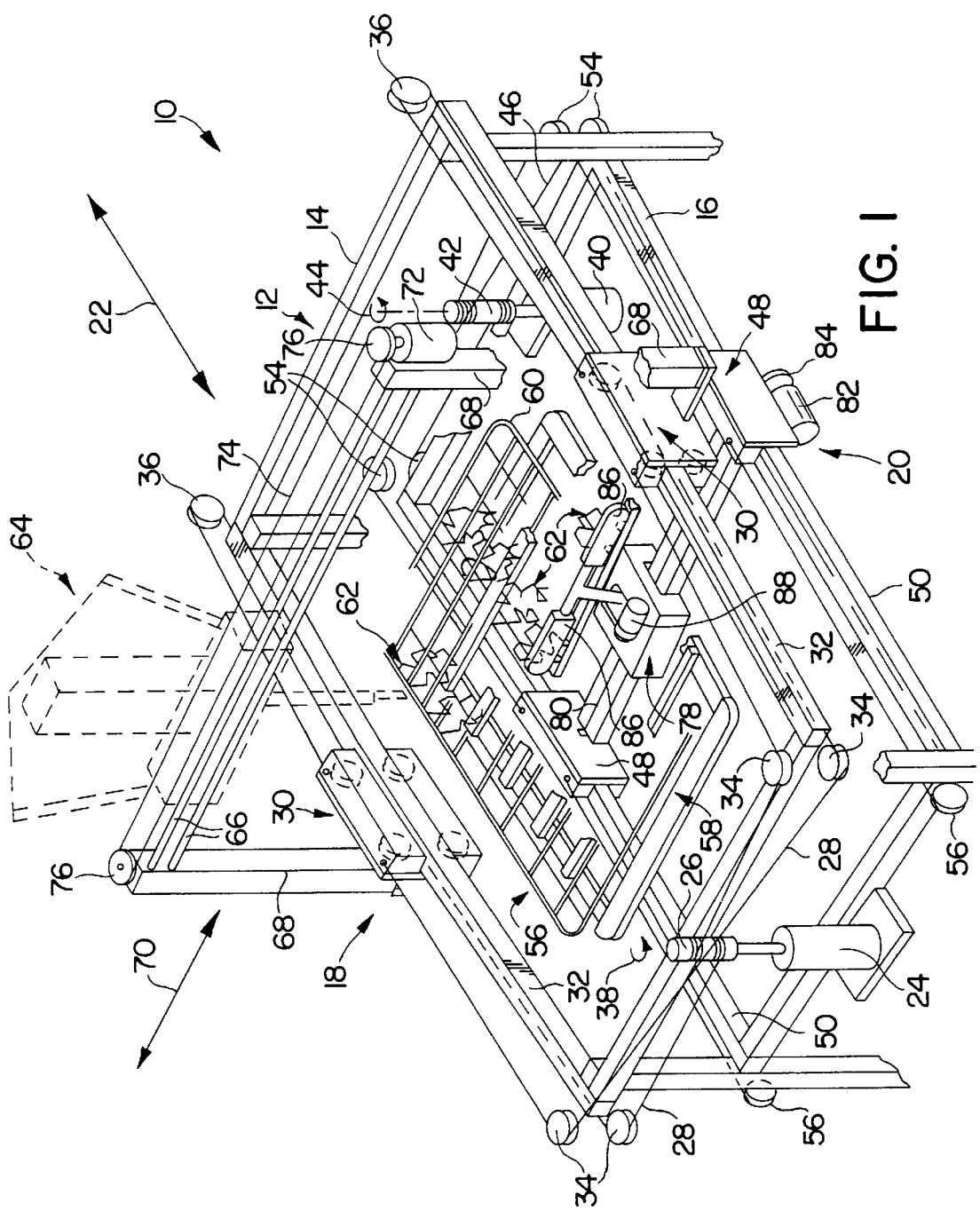
FIG. 1 is a perspective view of the box spring stapler apparatus of the present invention illustrating a bottom gantry for aligning a plurality of modules on a wood frame of the box spring and a top gantry for guiding a stapling apparatus for fastening a plurality of modules to the wood frame.

Referring now to the drawings, FIG. 1 illustrates a box spring stapler apparatus 10 according to the present invention. The apparatus 10 includes a base 12 including an upper rectangular frame 14 and a lower rectangular frame 16. Preferably, frames 14 and 16 are made from aluminum tracks or linear guides available from Item Products, Inc. located in Houston, Tex.

The apparatus 10 includes upper gantry 18 movable on upper frame 14. Apparatus 10 also includes a lower gantry 20 movable on lower frame 16. Movement of the upper gantry 18 along a longitudinal X axis of base 12 in the directions of double headed arrow 22 is provided by a motor 24 connected to a drum 26 for winding an unwinding cable 28. Cable 28 is coupled to movable cars 30 located on opposite frame members 32 of upper frame 14. Horizontally oriented pulleys 34 hold the cable 28 at one end of the frame 14. Vertically oriented pulleys 36 support the cable 28 at opposite ends of upper frame 14. Rotation of drum 26 causes movement of upper gantry 18 relative to upper frame 14 in the direction of double headed arrow 22.

Another drive motor 40 is provided for moving lower gantry 20 relative to lower frame 16. Motor 40 rotates drum 42 as illustrated by arrow 44. Rotation of drum 42 causes a cable 46 to be wound and unwound from the drum 42. Cable 46 is attached to cars 48 on opposite frame members 50 of lower frame 16. Therefore, rotation of drum 42 causes lower gantry 20 to move back and forth in the direction of double headed arrow 22 relative to lower frame 16. Cable 46 is guided by a pair of horizontal pulleys 54 at corners of one end of lower frame 16, and by vertically oriented pulleys 57 at opposite corners of lower frame 16.

Figure 2:
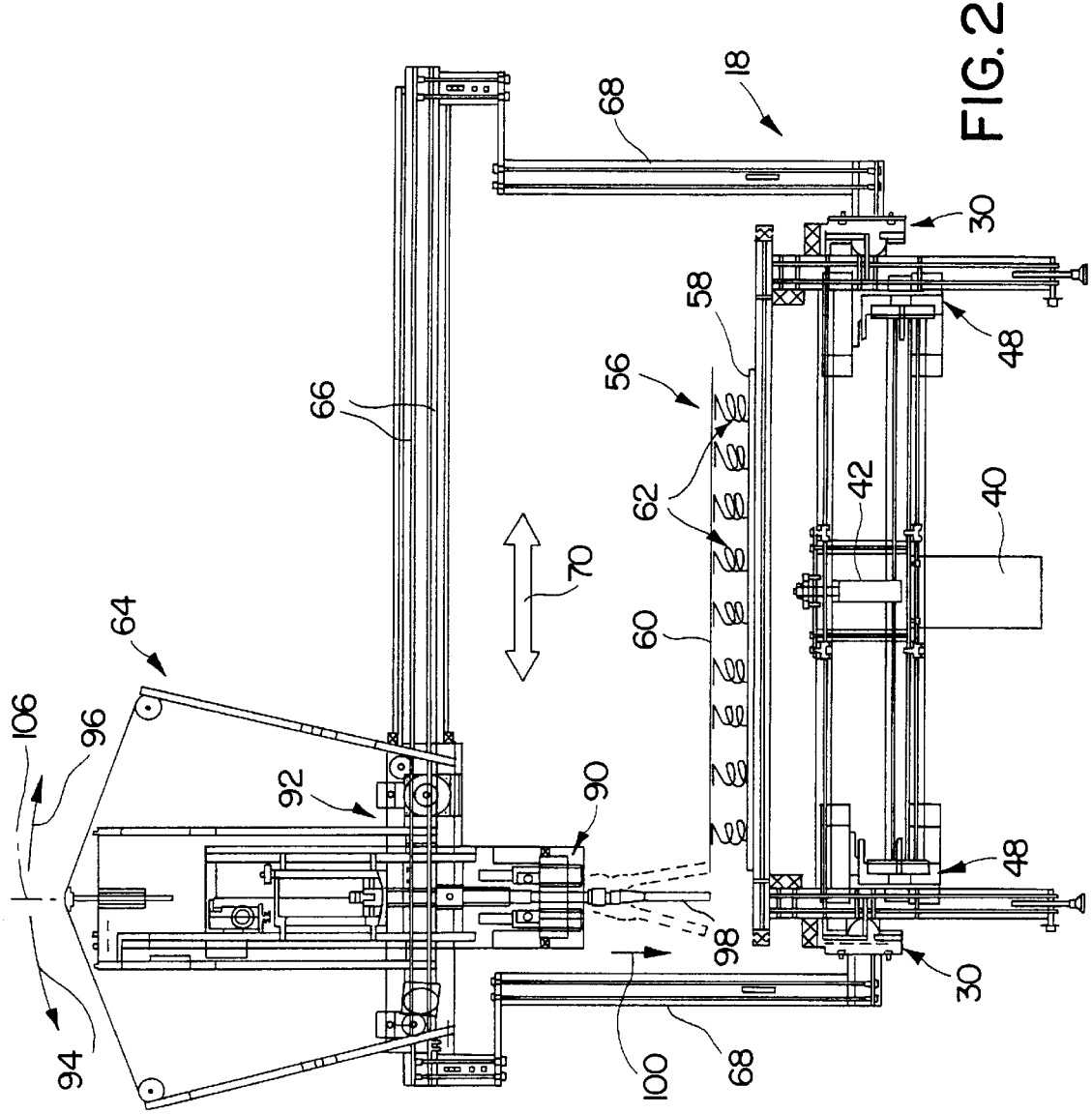
FIG. 2 is an end view of the apparatus of the present invention.

A box spring assembly 56 is supported on upper frame 14 as best illustrated in FIG. 2 discussed below. The box spring 56 includes a lower wooden frame 58, an upper wire grid 60, and a plurality of spring modules 62. The spring modules 62 are coupled to the wire grid 60 by interlocking the metal of the spring modules 62 with a cross member of the wire grid 60. Bottom ends of the modules 62 are then stapled to the wood frame 58.

A stapler apparatus 64 is located above box spring 56. Stapler apparatus 64 is slidably coupled to a track including spaced apart metal bars 66. Track 66 is coupled to cars 30 of gantry 18 by supports 68.

The stapler apparatus 64 is configured to be moved back and forth in the direction of double headed arrow 70 over the box spring 56 as the upper gantry 18 is moved by motor 24. Movement of stapler assembly 64 in the direction of double headed arrow 70 is controlled by motor 72 which drives a cable 74 over pulleys 76. Cable 74 is coupled to stapler assembly 64.

Bottom gantry 20 includes a module alignment apparatus 78 which is movable back and forth in the direction of double headed arrow 70 on track 80. Movement of alignment apparatus 78 is provided by motor 82 and cable 84 around pulleys adjacent cars 48. Alignment apparatus 78 includes a pair of paddles 86 movable by motor 88. Motors 82 and 88 control movement of alignment apparatus 78 so that paddles push the modules 62 onto the wood frame 58 from beneath the box spring 56 before the stapler 64 secures the modules 62 to the wood frame 58.

As illustrated in FIG. 2, the stapler apparatus 64 moves over the box spring 56. Movement of the stapler apparatus 64 is controlled in many directions. This permits the stapler apparatus 64 to pass through the top grid and through the modules 62 to staple a desired target portion of the module 62 to the wood frame 58. For instance, as discussed in detail below, the stapler 90 is mounted in a gimble 92 so that the stapler 90 can be pivoted, for example, in the directions of arrows 94 or 96 to move a stapler head 98 to the dotted positions of FIG. 2. Therefore, the stapler head 98 can be aligned at a desired angle relative to a particular spring module 62 in order for the stapler head 98 to pass through the grid 60 and spring module 62. Once the stapler head 98 is in the desired position, it is extended downwardly in the direction of arrow 100 to staple the module 62 to the wood frame 58.

Figure 3:
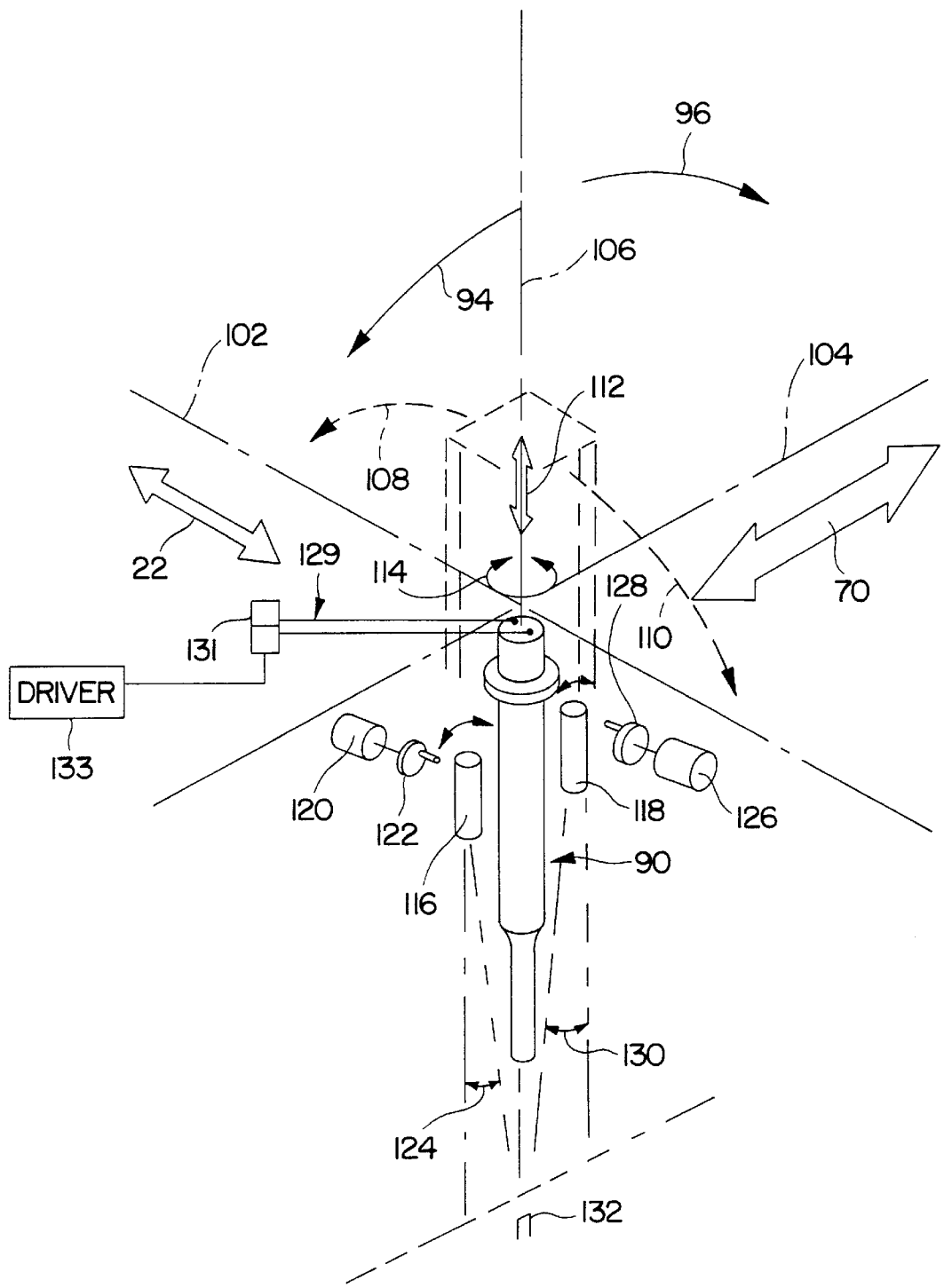
FIG. 3 is a diagrammatical view illustrating movement of the stapler apparatus and of first and second cameras for providing a visual guidant system for the stapler apparatus.

Further details of the movement of stapler 90 are illustrated in FIG. 3. Stapler 90 is moved along an X axis 102 in the direction of double headed arrow 22 by upper gantry 18. Movement of stapler 90 is also provided along Y axis 104 in the direction of double headed arrow 70 by motor 72. Stapler 90 can also be pivoted. First, stapler 90 can be pivoted about axis 102 in the direction of arrows 94 and 96. Stapler 90 can also be pivoted about axis 104 in the direction of arrows 108 and 110. In addition, stapler 90 can be moved up and down along longitudinal axis 106 as indicated by double headed arrow 112. Finally, stapler 90 can be rotated about its longitudinal axis 106 as indicated by double headed arrow 114. These wide range of movements of stapler 90 permits the approach angle of stapler 90 to be adjusted relative to grid 60 and modules 62 so that the desired target portion of modules 62 can be stapled to wood frame 58.

The stapler apparatus 64 includes a first camera 116 and a second camera 118 mounted adjacent stapler 90 as discussed below. Cameras 116 and 118 provide vision to guide placement of a staple 132 over the modules 62 into the wood frame 58. The angle of camera 116 can be adjusted by a motor 120 and cam 122. Preferably, the angle of camera 116 can be adjusted about 10° as illustrated by angle 124. Similarly, the angle of camera 118 can be adjusted by motor 126 and cam 128 to move camera 118 as illustrated by angle 130. Preferably, the leading camera 116 or 118 detects the image of the modules 62. The detected image is compared to an optimum location for modules 62 relative to the wood frame 58. The leading camera 116 or 118 uses pattern recognition to locate the desired location for the stapler and then to adjust the position of the module 62 before securing the module 62 to the frame 58. The trailing camera 118 or 116 may be used for inspection of the stapled area, if desired.

An air cylinder (not shown) is located inside stapler 90 to drive in the staples 132. The air cylinder is controlled by two air lines 129 connected to a top end of stapler 90. The lines 129 extend upwardly through the stapler apparatus 64 and are coupled to an air valve 131. Valve 131 is controlled by a driver 133 to control actuation of the stapler 90.

Figure 4:
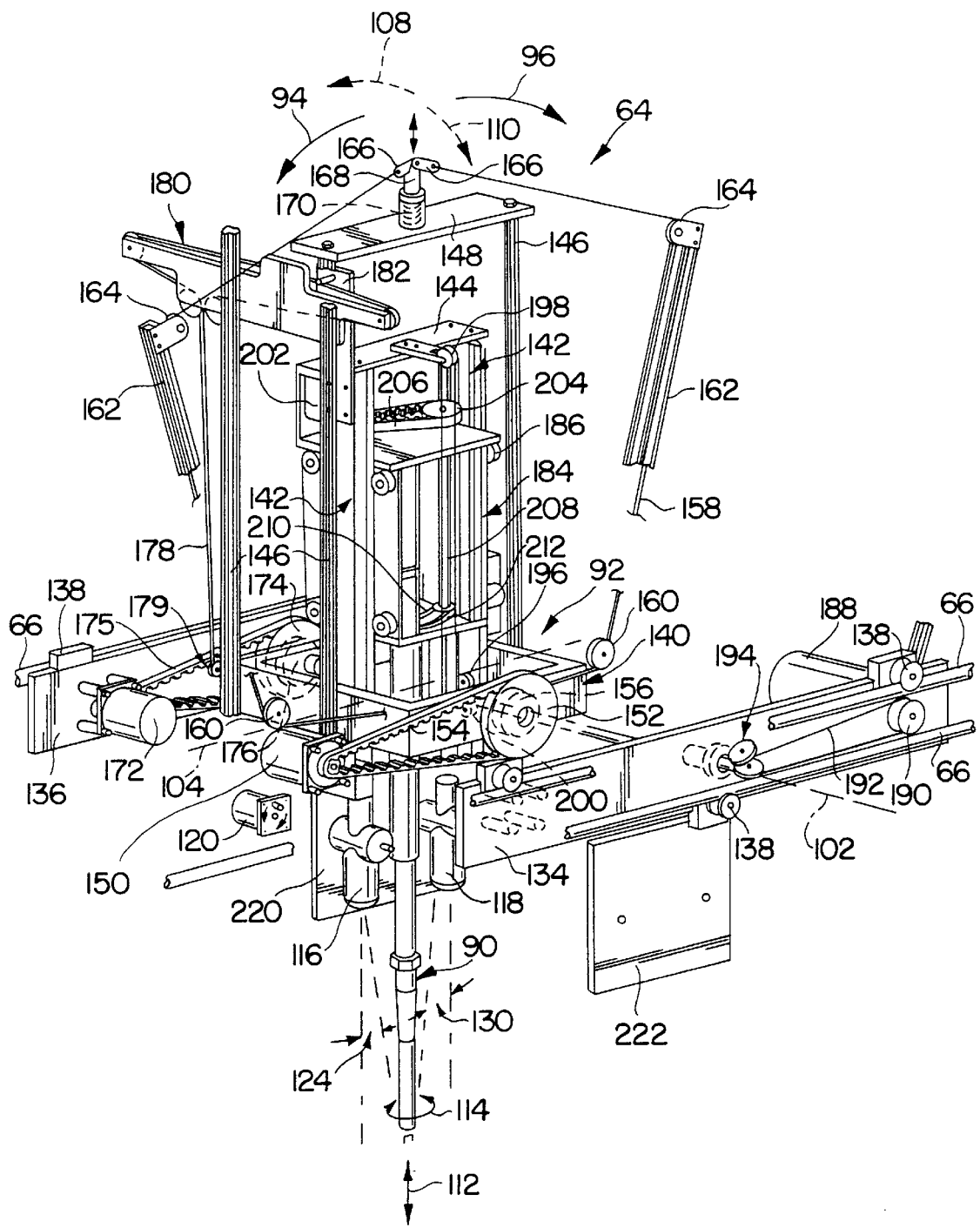
FIG. 4 is an exploded perspective view with portions broken away illustrating the structural components required to move and control the stapler apparatus.

Details of the structure for providing movement of the stapler apparatus 64 are illustrated in FIG. 4. The stapler assembly 64 includes a pair of opposite support plates 134 and 136 which ride on rails 66. Each support plate 134 and 136 includes three rollers 138 for engaging rails 66. Gimble 92 includes a rectangular frame 140 pivotably coupled between support plates 134 and 136 about axis 102.

Guide track members 142 are pivotably coupled inside rectangular gimble frame 140 about axis 104. A plate 144 extends between track members 142. Three vertical supports 146 are rigidly coupled to gimble frame 140. A plate 148 extends between two of the supports 146.

Pivotable movement of gimble 92 about axis 102 controlled by motor 150. Motor 150 is coupled to timing gear 152 by belt 154. Timing gear 152 rotates a drum 156 for winding and unwinding a cable 158. Cable 158 extends from drum 156 over pulleys 160, along angled supports 162, around pulleys 164, and is anchored to top plate 148 by fasteners 166 coupled to a post 168. A spring 170 biases the post 168 upwardly to maintain proper tension in cable 158. Rotation of motor 150 in a first direction causes gimble 92 to pivot in the direction of arrow 94. Rotation of motor 150 in a second direction causes gimble 92 to pivot about axis 102 in the direction of arrow 96.

Pivotable movement of track members 142 inside gimble frame 140 is controlled by motor 172 coupled to support plate 146. Motor 172 is coupled to timing gear 174 by belt 175. Timing gear 174 is coupled to a drum 176 for winding and unwinding a cable 178. Cable 178 extends to pulleys 179 and then upwardly through pulley assembly 180. Cable 178 is coupled to a mounting plate 182 which is rigidly coupled to one track member 142. Therefore, rotation of motor 172 in a first direction causes frame members 142 and stapler 90 to pivot relative to gimble frame 140 in the direction of arrow 108. Rotation of motor 172 in the opposite direction causes frame members 142 to pivot inside gimble frame 140 in the direction of arrow 110.

Stapler 90 is mounted on a movable carriage 184. Carriage 184 includes rollers 186 which move on track members 142 to move stapler up and down in the direction of double headed arrow 112. Movement in the direction of arrow 112 is controlled by motor 188. Motor 188 drives a drum 190 to move cable 192. Cable 192 passes over pulleys 194 and then along axis 102. One end of the cable 192 passes over pulley 196 upwardly to pulley 198 and is then coupled to carriage 184. Another end of cable 192 passes downwardly over pulley 200 and around a lower pulley (not shown) before being coupled to carriage 184. Rotation of motor 188 in a first direction causes the carriage 184 and the stapler 90 to move downwardly to install a staple 132 to secure module 62 to wood frame 58. Rotation of motor 188 in an opposite direction causes the carriage 184 and the stapler 90 to move upwardly.

Rotation of stapler 90 in the direction of double headed arrow 114 is controlled by motor 202 coupled to carriage 184. Motor 202 is coupled to a timing gear 204 by belt 206. Timing gear 204 drives a shaft 208. Shaft 208 is coupled to another gear 210 by belt 212 to rotate stapler 90 in the direction of double headed arrow 114.

Cameras 116 and 118 and motors 120 and 126 extend between support plates 220 and 222 which are coupled to lower ends of track members 142. Rotation of motors 120 and 126 cause pivotable movement of cameras 116 and 118.

Figure 5:
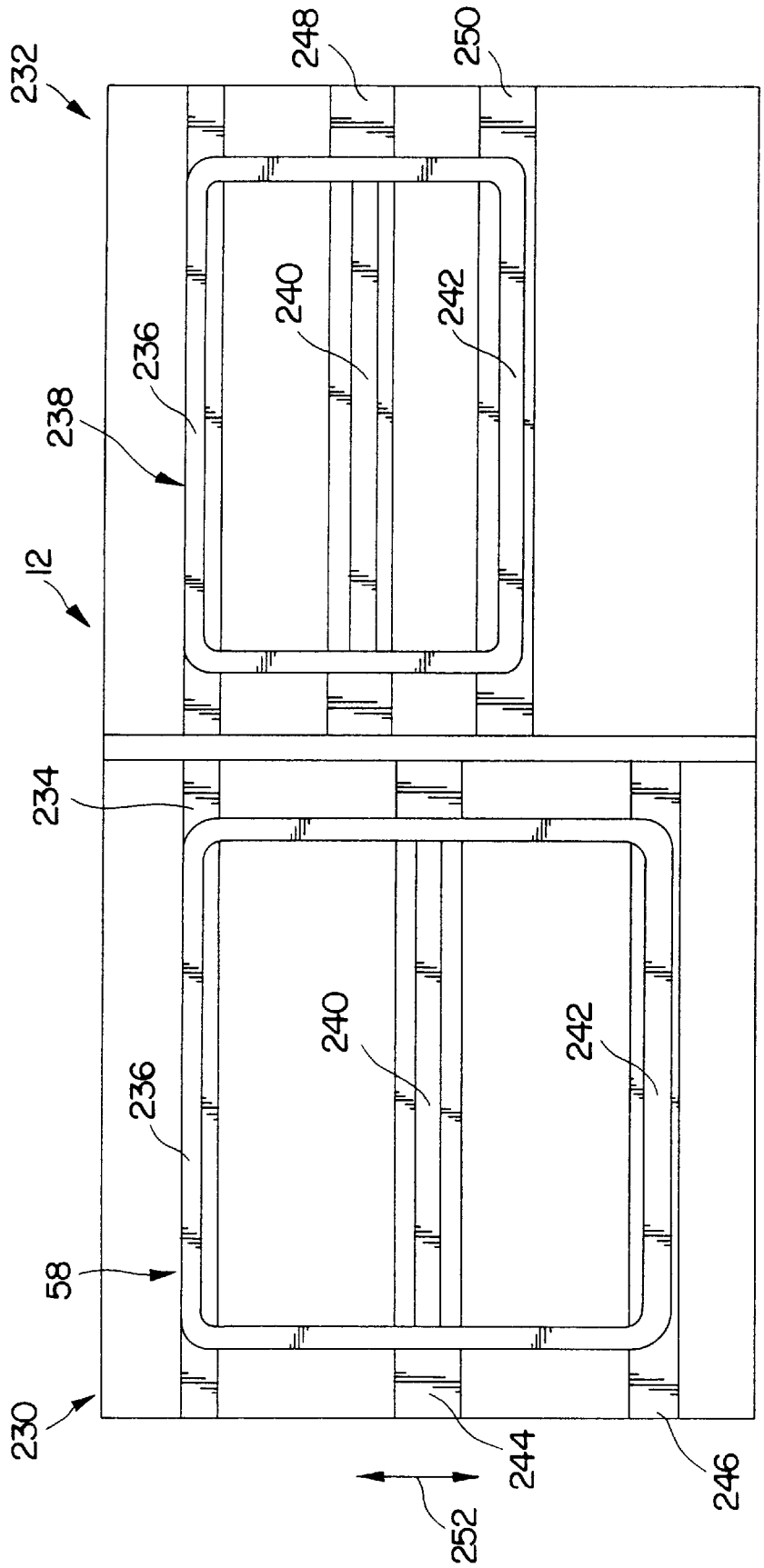
FIG. 5 is a diagrammatical view illustrating movable left and right side frame supports of the base for holding different size wooden frames during the stapling process.
Figure 6:
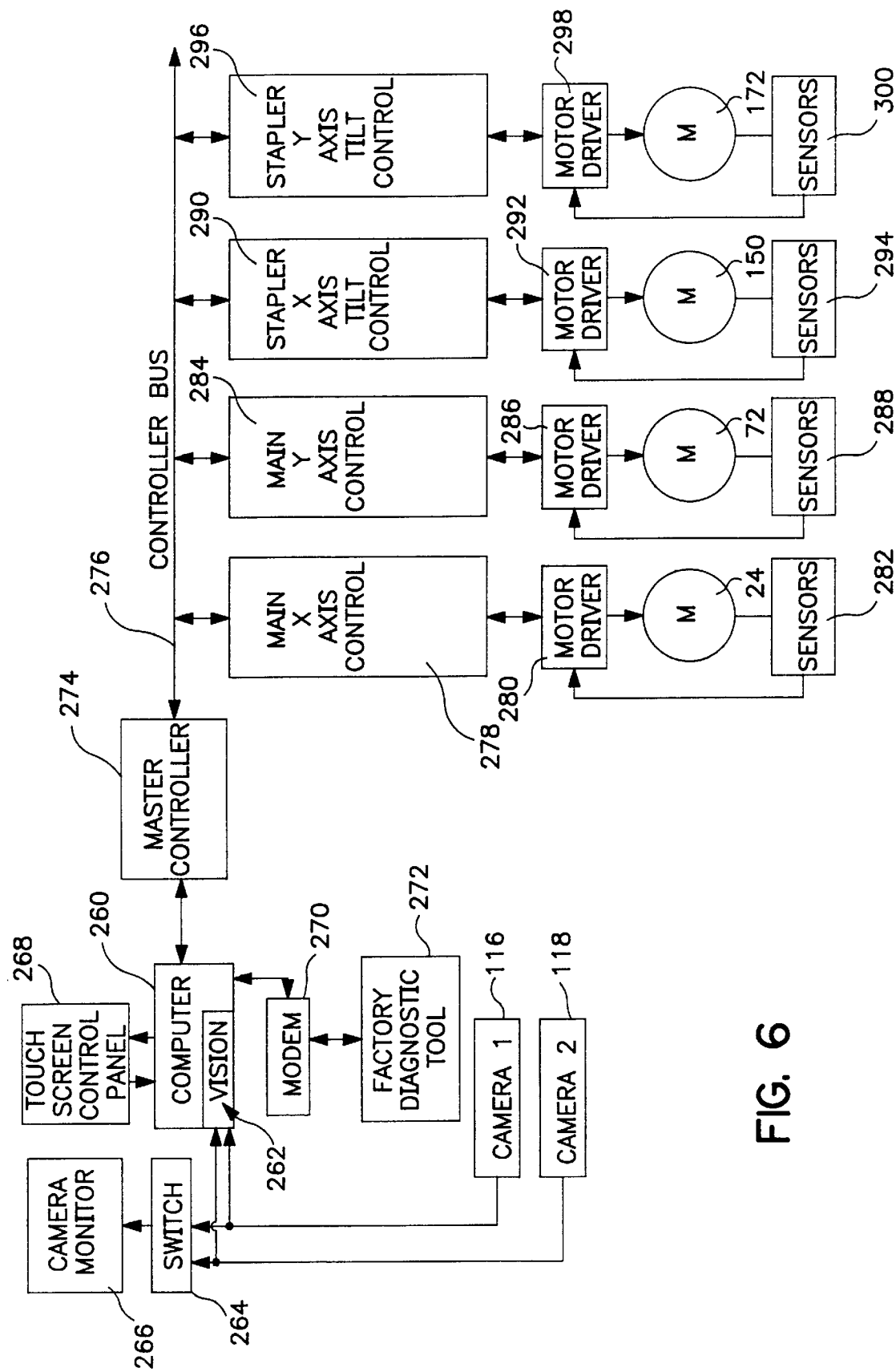
FIG. 6 is a block diagram of the hardware for controlling operation of the stapler apparatus.
Figure 8:
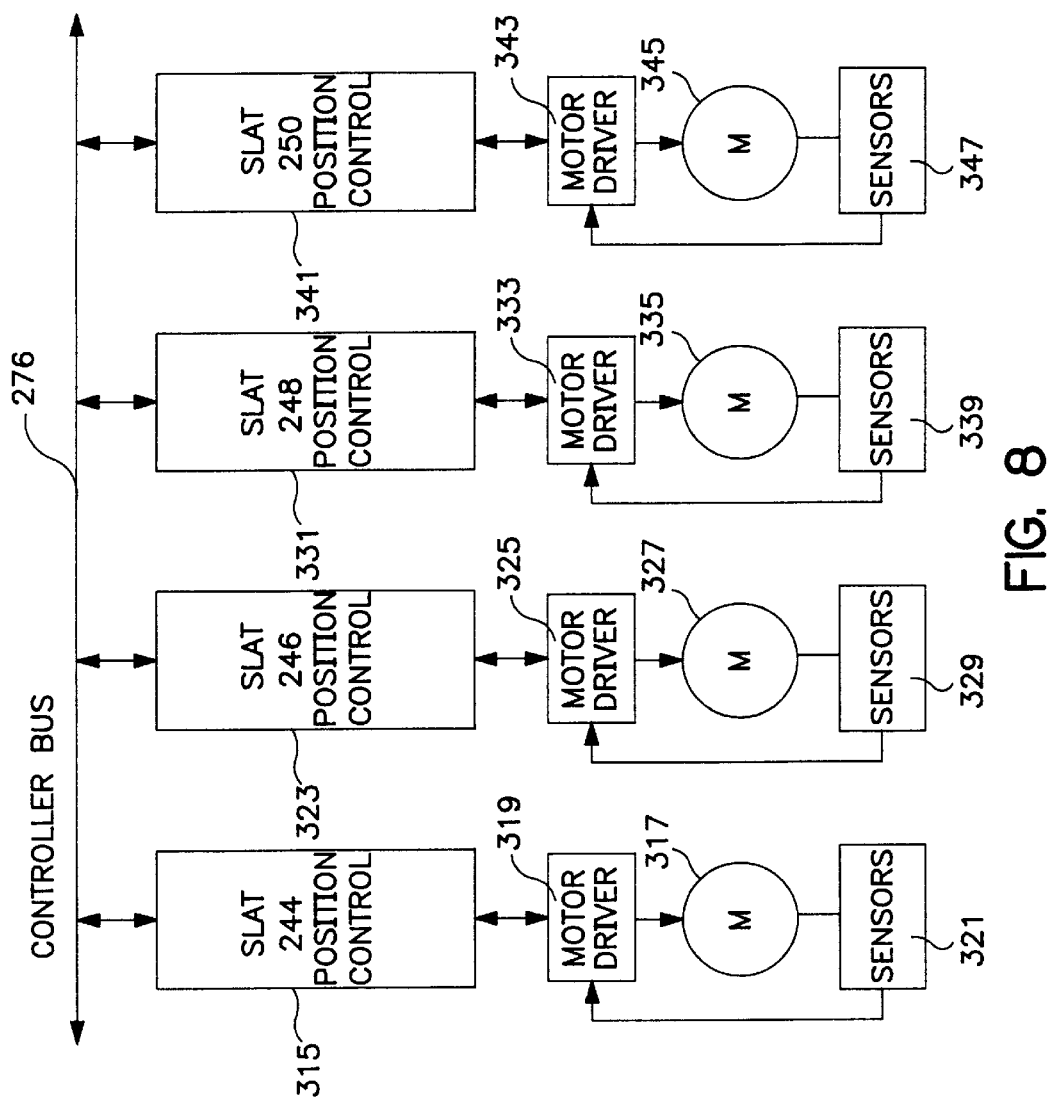
FIG. 8 is a block diagram illustrating additional controllers for the stapler apparatus.

FIG. 5 illustrates a preferred embodiment of the present invention in which the base 12 for supporting the box springs 56 includes two separate frame sections, including a left frame section 230 and a right frame section 232. The left and right frame sections 230 and 232 include a fixed support beam 234 for supporting one side slat 236 of wood frames 58 and 238. Illustratively, wood frame 58 is for a queen size box spring, and wood frame 238 is for a twin size wood frames. Box springs 58 and 238 both include center support slat 240 and a second side slat 242. Transverse slats on frames 58 and 238 are not shown in FIG. 5. The spacing between slats 236, 240, and 242 is different depending upon the size of the box spring. Therefore, left frame section 230 includes a left center frame support 244 and a left outer frame support 246. Right frame section 232 includes a right center frame support 248 and a right outer frame support 250. Supports 244, 246, 248, and 250 are all adjustable relative to base 12 in the direction of double headed arrow 252. The supports 244, 246, 248, and 250 can be manually adjusted to the positions shown in FIG. 5 to align the center supports 244 and 248 with the center slats 240 of frames 58 and 238 and to align the outer supports 246 and 250 with the outer slats 242. The location of supports 244, 246, 248, and 250 may be automatically adjustable to a programmed position depending upon the size and configuration of the box spring. Preferably, a motor drive including cable and pulley system is used to move the supports 244, 246, 248, and 250 relative to frame 12. By aligning the supports 244, 246, 248, and 250 below the slats 240 and 242, access is provided to spring modules 62 for the alignment apparatus 78 from below the wood frames 58 and 238. Controllers for moving supports 244, 246, 248, and 250 are illustrated in FIG. 8.

The details of the control features of the present invention are illustrated in FIGS. 6–9. Operation of the apparatus of the present invention is controlled by a computer 260 including a vision board 262 plugged into computer 260. Illustratively, vision board 262 is a GPB-2 Image Processing Board available from Sharp. Preferably, computer 260 includes a Pentium microprocessor. Vision board 262 is coupled to cameras 116 and 118. A switch 164 also couples cameras 116 and 118 to a camera monitor 266. Preferably, the stapler apparatus is programmed and operated using a touch screen control panel 268 coupled to computer 260. Illustratively, touch screen control panel 268 includes a CRT monitor with a "Micro-Touch" touch screen overlay.

Computer 260 is also coupled to a modem 270 to provide a connection to a remote factory location. This permits access to computer 260 by a factory diagnostic tool 272. In other words, stored diagnostic data about the operation of the stapler apparatus is accessible from the remote factory location. In addition, the stapler apparatus can be operated and tested from the remote factory location through the modem 270.

The apparatus also includes a master controller 274 coupled to computer 260. During operation of the stapler apparatus, computer 260 passes command data blocks to the master controller 274 which, in turn, passes the command data blocks to a correct axis controller or input/output device as discussed below. Master controller 274 requests additional command blocks from computer 260 as needed and passes the command blocks to axis controllers in a timely manner. The master controller 274 also provides the sync clock for the apparatus. Each axis controller can pass data blocks back to the master controller 274. Master controller 274 determines how to handle the data, such as passing the data block to computer 260, reporting error to the computer 260, passing sensor responses to initiate a next cycle, etc.

Master controller 274 is coupled to a main controller bus 276. Controller bus 276 is coupled to a main X axis controller 278 for controlling motor 24 to move the upper gantry 18 along frame 12 in the direction of double headed arrow 22 of FIG. 1. Main X axis controller 278 is coupled to a motor driver 280 which is coupled to motor 24. Position sensors 282 provide feedback information about the position of gantry to the motor driver 280.

Controller bus 276 is also coupled to a main Y axis controller 284. Controller 284 controls motor 72 to move the stapler apparatus 64 along track 66 in the directions of double headed arrow 70. Main Y axis controller 284 is coupled to a motor driver 286 which controls motor 72. Sensors 288 provide feedback to motor driver about the position of stapler apparatus 64 on the tracks 66.

Controller bus 276 is also coupled to a stapler X axis tilt controller 290 which is used to control motor 150 to pivot the gimble frame 140 relative to supports 134 and 136. Controller 290 is coupled to a motor driver 292 which controls motor 150. Sensors 294 provide an indication of the tilt angle of gimble frame 140 to provide feedback to motor driver 292.

Controller bus 276 is also coupled to a stapler Y axis tilt controller 296. Controller 296 controls operation of motor 172 to pivot track members 142 inside gimble frame 140. Controller 296 is coupled to a motor driver 298 for controlling motor 172. Sensors 300 provide output indicating the tilt angle of train members 142. Sensors 300 provide feedback to motor driver 298.

Figure 7:
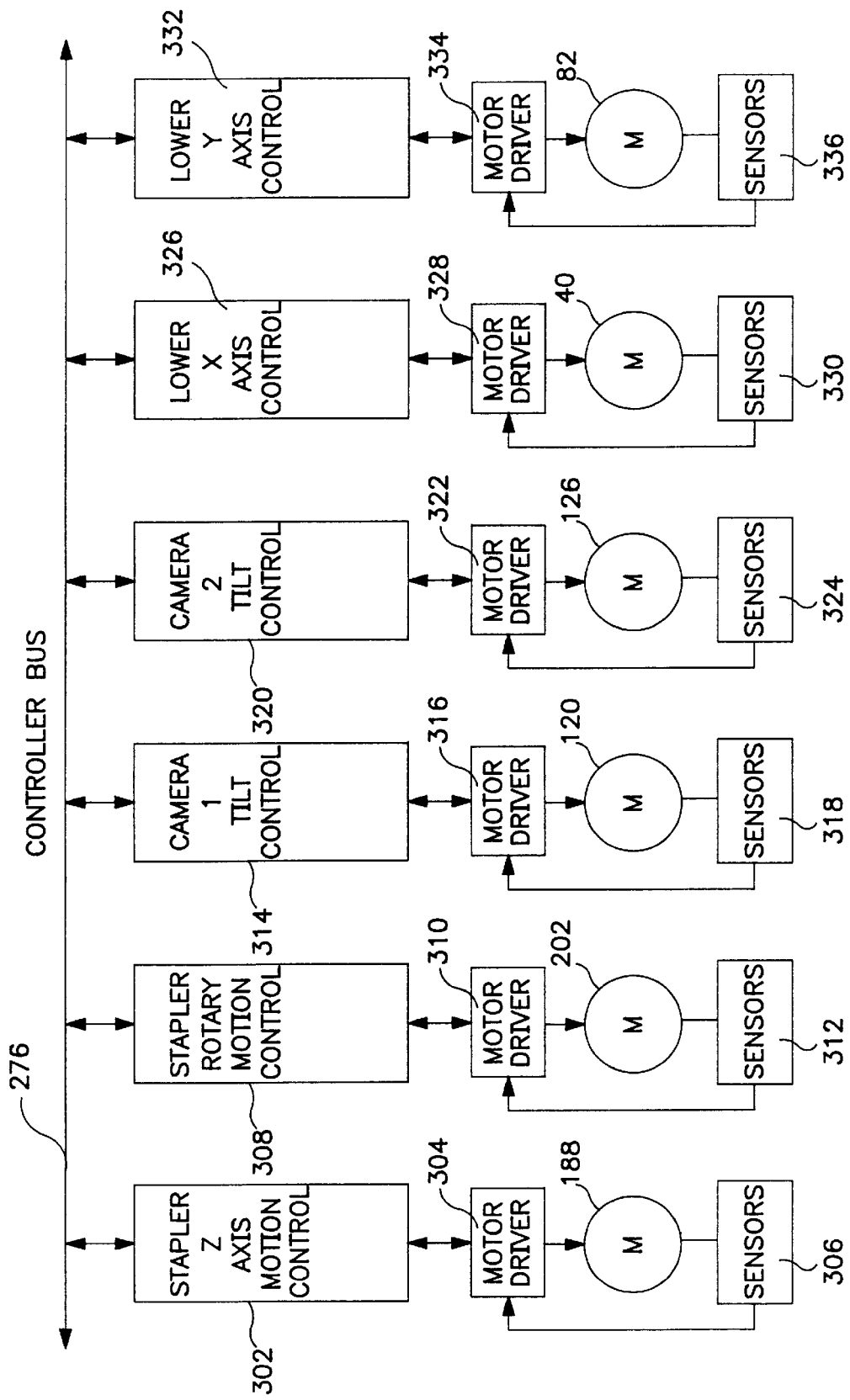
FIG. 7 is a block diagram illustrating further controllers for driving a plurality of motors to move components of the stapler apparatus.

Referring now to FIG. 7, controller bus 276 is coupled to a stapler Z axis motion controller 302. Controller 302 controls operation of motor 188 to control movement of carriage 184 on track members 142 in the directions of double headed arrow 112. Controller 302 is coupled to motor driver 304 for controlling operation of motor 188. Sensors 306 provide output signals indicative of the location of carriage 184 relative to track members 142. Sensors 306 provide an output feedback signal to motor driver 304.

Controller bus 276 is also coupled to a stapler rotary motion controller 308. Rotary motion controller controls operation of motor 202 to rotate stapler 90 about its longitudinal axis 106 in the direction of double headed arrow 114. Controller 308 is coupled to a motor driver 310 for controlling motor 202. Sensors 312 are provided to generate an output signal indicating the rotational position of stapler 90. An output from sensors 312 provides feedback to motor driver 310.

Controller bus 276 is also coupled to a camera 1 tilt controller 314. Controller 314 controls motor 120 to adjust the position of camera 116. Controller 314 is coupled to a motor driver 316 for controlling motor 120. A sensor 318 provides an output signal indicating the position of camera 116. The output signal from sensor 318 provides a feedback signal to motor driver 316.

Controller bus 276 is also coupled to a camera 2 tilt controller 320. Controller 320 controls motor 126 to tilt camera 118. Controller 320 is coupled to a motor driver 322 which controls motor 126. A sensor 324 provides an output signal indicating the angle of camera 118. Sensor 324 provides a feedback output signal to motor driver 322.

Controller bus 276 is also coupled to a lower gantry X axis controller 326. Controller 326 controls motor 40 to move lower gantry 20 in the direction of double headed arrow 22 relative to lower frame 16 to control the position of the alignment apparatus 78. Controller 326 is coupled to a motor driver 328 for controlling motor 40. Sensors 330 provide an output signal indicating the position of gantry 20 relative to frame 16. Sensors 330 provide a feedback signal to motor driver 328.

Controller bus 276 is also coupled to a lower gantry Y axis controller 332. Controller 332 controls motor 82 for moving the alignment apparatus 78 on track 80 back and forth in the direction of double headed arrow 70. Controller 332 is coupled to a motor driver 334 for controlling motor 82. Position sensors 336 are provided to generate an output signal indicating the position of alignment apparatus 78. Sensors 336 provide a feedback signal to motor driver 334.

Referring now to FIG. 8, controller bus 276 is also coupled to a position controller 315 for support slat 244 illustrated in FIG. 5. Controller 315 controls operation of a motor 317 which moves the slat 244 to a desired position as discussed above. Controller 315 is coupled to a motor driver 319 for controlling motor 317. Sensors 321 are provided to generate an output signal indicating the position of slat 244. Sensors 321 provide a feedback signal to motor driver 319.

Controller bus 276 is also coupled to a position controller 323 for controlling the location of support slat 246. Controller 323 is coupled to a motor driver 325 for controlling a motor 327. Motor 327 controls the position of slat 246 relative to the left frame section 230. Sensors 329 are provided to generate an output signal indicating the position of slat 246. Sensors 329 provide a feedback signal to motor driver 325.

Controller bus 276 is also coupled to a position controller 331 for moving the support slat 248 illustrated in FIG. 5. Controller 331 is coupled to a motor driver 333 for controlling a motor 335. Motor 335 controls the position of slat 248 relative to the right frame section 232. Sensors 337 are provided to generate an output signal indicating the position of slat 248. Sensors 339 provide a feedback signal to motor driver 333.

In addition, controller bus 276 is coupled to a position controller 341 for support slat 250 of FIG. 5. Controller 341 is coupled to a motor driver 343 which controls a motor 345. Motor 345 controls the position of slat 250 relative to right frame section 232. Sensors 347 are provided to generate an output signal indicating the position of slat 250. Sensors 347 provide a feedback signal to motor driver 343.

Figure 9:
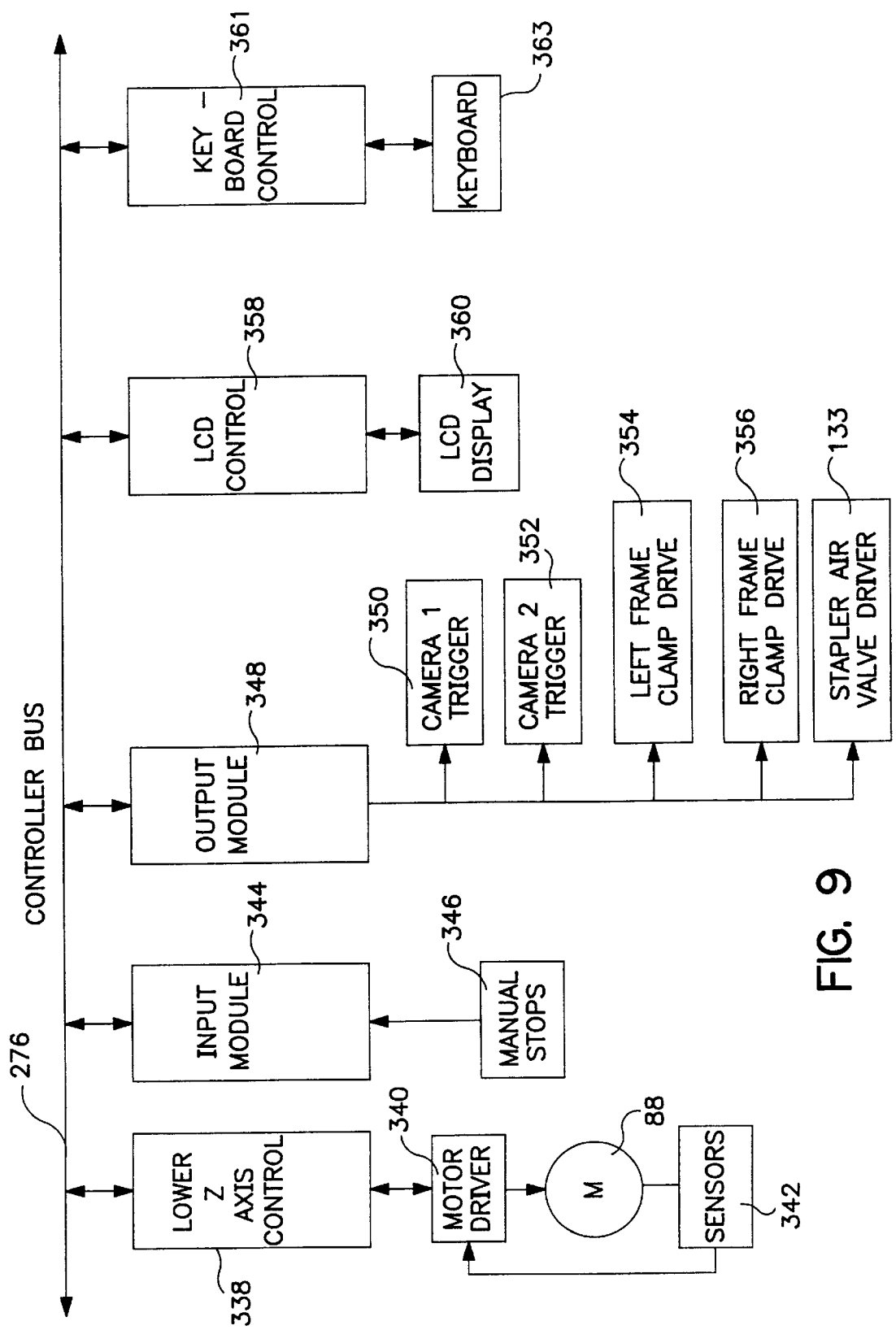
FIG. 9 is a block diagram illustrating still more controllers for the stapler apparatus.

Referring now to FIG. 9, controller bus 276 is also coupled to a Z axis controller 338 for alignment apparatus 78. Controller 338 controls operation of motor 88 to move the paddles 86 of the alignment apparatus 78 upwardly relative to frame 16 to position the modules 62 on the wood frame 58. Controller 338 is coupled to a motor driver 340 for controlling motor 88. Sensors 342 are provided to generate an output signal indicating the position of paddles 86. Sensors 342 provide a feedback signal to motor driver 340.

Controller bus 276 is also coupled to an input module 344. Input module 344 receives inputs for controlling various aspects of the invention. For instance, manual stops 346 are coupled to input module 344. Preferably, manual emergency stops 346 are located adjacent each corner of the base frame 12. Another manual emergency stop is preferably located near touch screen control panel 268. Activating the emergency manual stops 346 shuts down the operation of the stapler apparatus.

Controller bus 276 is also coupled to an output module 348. Output module 348 controls a camera trigger 350 for camera 116 and a camera trigger 352 for camera 118. This permits cameras 116 and 118 to be triggered instantaneously when an image is required.

Output module 348 also controls a left frame clamp drive 354 and a right frame clamp drive 356. These clamps (now shown) are activated to hold the wood frames 58 and 238 in place on base frame 12. Output module 348 further controls stapler air valve driver 133.

Controller bus 276 is coupled to a LCD controller 358. Controller 358 controls output to a LCD display 260.

Finally, controller bus 276 is coupled to a keyboard controller 361. Keyboard controller 361 is used to control a keyboard 363 for trouble-shooting or debugging the system.

Each motor driver discussed above has the capability of inputting and outputting eight bits of data in either direction. Therefore, each axis controller can pass a request to the motor driver asking for a particular sensor to be read, or to close a valve, or any other on/off signal or control function. Master controller 274 passes data to the selected controllers over controller bus 276 which is a high-speed, parallel computer bus.

The motors used in the present invention are preferably stepper motors. Conventional micro-step stepper motor drivers are controlled by a number of signal lines connected in parallel between the controller and a connector of the motor driver. Conventional control signal lines in prior art devices are coupled to an 8 pin connector of motor drivers as follows:

Pin 1: OPTO (Opto-Isolator Supply). User supplied power for the opto-isolators.

Pin 2: PULSE (Pulse Input). A low to high transition on this pin advances the motor one step. The step size is determined by the Step Resolution switch setting.

Pin 3: DIR (Direction Input). When this signal is high, motor rotation will be clockwise. Motor rotation will be counterclockwise when this signal is low. Clockwise and counterclockwise directions are properly oriented when viewing the motor from the end opposite the mounting flange.

Pin 4: AWO (All Windings Off Input). When this signal is low, AC and DC current to the motor will be zero. There is no holding torque when the AWO signal is low.

Pin 5: RDCE (Reduce Current Input). The motor current will be 50% of the selected value when this signal is low. Holding torque is also reduced when this signal is low.

Pin 6: BOOST (Boost Current Input). When this signal is low, the motor current is 150% of the selected level up to a maximum of 6 amperes.

Pin 7: RESET (Reset Input). The translator goes to the "power up" state when this signal goes low.

Pin 8: READY (Ready Output). This pin is the emitter of an opto-isolator that activates when the drive is ready to run a motor.

The group of lines PULSE, DIR, AWO, RDCE, BOOST, RESET, and READY in the conventional controller are parallel lines coupled between the controller and the motor driver. The other functions of the prior art motor driver, including power level setting, and micro-step resolution setting are manually set by hardware switches located on the motor driver and cannot be changed under software control. In the prior art controller, the device must be shut down to change the power level setting and/or the micro-step resolution setting manually. The settings are then changed only after the device is powered up again from reset.

Several problems exist during operation of such conventional controllers since neither power level setting, nor micro-step resolution setting are software controllable. First, in many applications the full power need only be applied to the motor for a small portion of the duty cycle. Without software control of power level setting, the motor must endure full power which increases heat and reduces motor life. In addition, for short periods of time, a motor can be driven beyond its normal operation power level (up to 200% and above) without any damage to the motor, thus delivering more torque for a short period of time.

The prior art device cannot automatically adjust the motor power level setting. The only control of the motor power is through the AWO signal line for setting the motor current to zero, the RDC signal line for reducing the motor current to 50%, and the BOOST signal line for increasing the motor to 150% of the set level. The controller of the present invention can adjust the power setting during operation of the motor in real time to a plurality of different power level settings. Therefore, during operation of the motor, the present invention can change the power level setting of the motor from 0% power to over 200% power, depending upon the particular application.

A second problem of prior art devices is the inability of conventional devices to change the micro-step resolution setting while the motor is running in real time. In most stepper motor applications, the motors start stepping slow, accelerate to a given step rate, run at that given step rate for some time or step count, and then decelerate and stop or run at some other speed. The controller of the present invention can also change the micro-step resolution setting of the motor during continued operation of the motor. During slow speeds (rpm) of the motor, it is very desirable to have the micro-stop resolution set high, for example, 10,000–25,000 micro-step pulses per revolution. Then as the speed (rpm) of the motor increases, the micro-step resolution can be reduced. At very high speeds (rpm), the motor need only be full stepped. In conventional devices, the motor driver does not have the capability of changing micro-step resolution on the fly in real time. Therefore, the pulse rate to the motor becomes very large. This high pulse rate puts unnecessary duty cycle burden on both the controller and the motor driver. The effect of this burden in present equipment is two-fold. First, the controllers must run faster, thus increasing the complexity and cost of the hardware and also reducing capability. The second effect is to compromise the slow speed micro-step resolution in order to keep the micro-step rate down as the motor speeds up. This affects the smoothness of operation of the motor at low rpm. The smoothness issue is discussed on page 12 of the WARNER ELECTRIC installation and instruction manual.

As discussed above, the present invention allows the control parameters including the power setting and the micro-step resolution setting, of the micro-step motor driver to be programmed on the fly, in real time, while the motor is continuously running. The control parameters can be changed each time the motor is micro-stepped.

In the present invention, each motor controller is connected to its respective micro-step motor driver via a full duplex serial control line. Each time a byte of date is passed to the motor driver and the step bit is set, the motor is indexed. The micro-controller inside the motor driver then decodes the data passed from the controller and makes any changes directed by that data. If the step bit is not set, the motor will not be indexed. However, the data passed is decoded by the micro-controller inside the motor driver, and any changes directed are made as above. This allows control parameter changes without indexing the motor.

The motor controller of the present invention is capable of controlling the motor driver using the serial byte of data passed to the motor driver to both index the driver and also change the operating parameters during each micro-step of the motor. The motor micro-step is set by the period between transmission of data to the driver. This period is set by the controller and is software programmable. Therefore, all the controllers can be synchronized and phase locked. This is done by all controllers being connected to a master clock through a divide by N module counter. Accordingly, all controllers are running at some division of the master clock. Each controller has the circuits to do the divide by N. The N in each controller can be changed on the fly between each micro-step. This provides means of changing the period between data transmission to the motor driver which changes the micro-step rate and thus the motor RPM.

Each motor driver of the present invention is controlled with one control data block. Each bit in the control data block is decoded by the motor driver and the appropriate action is taken.

Bit 7: Step/No-step. If this bit is set, then the driver will index the motor then decode the remainder of the byte and execute any additional action.

Bit 6: Direction. If this bit is set, then the motor will rotate CW. If clear, then the motor will rotate CCW.

Bit 5: Resolution. If this bit is set, the driver will decode bits 0, 1, 2 and change the micro-step resolution.

Bit 4: Power. If this bit is set, the driver will decode bits 0, 1, 2 and change the power setting of the motor.

Bit 3: Reset. If this bit is set, the driver will load the default setting into the driver.

Bit 2: Data. Power/Resolution.

Bit 1: Data. Power/Resolution.

Bit 0: Data. Power/Resolution.

In other words, the controllers of the present invention transmit the serial byte of data to the motor drivers. If it is desired to change the micro-step resolution during operation of the motor, the controller sets bit 5. If bit 5 is set, the motor driver then decodes bits 0, 1 and 2 to determine the desired new micro-step resolution setting for the stepper motor. The motor driver then automatically loads internal counters of the motor driver with new data based on the decoded bits 0, 1 and 2 in real time to change the micro-step resolution setting of the stepper motor.

In the same manner, the power level setting for the stepper motor may be adjusted. When it is desired to change the power level setting for the stepper motor, the controller of the present invention sets bit 4 of the control data. If bit 4 is set, the motor driver decodes bits 0, 1 and 2 to determine the desired new power level setting for the stepper motor. Motor driver then automatically updates the power level setting during continued operation of the motor.

As discussed, there is no need to shut off the motor in order to adjust the micro-step resolution setting or the power level setting for the stepper motor. Therefore, the stepper motors of the present invention can be operated at a high micro-step resolution at low speeds of the motor. As the speed of the motor increases, the controllers can automatically lower the micro-step resolution setting of the motor. As discussed above, this improves smoothness of operation of the stepper motor.

Figure 10:
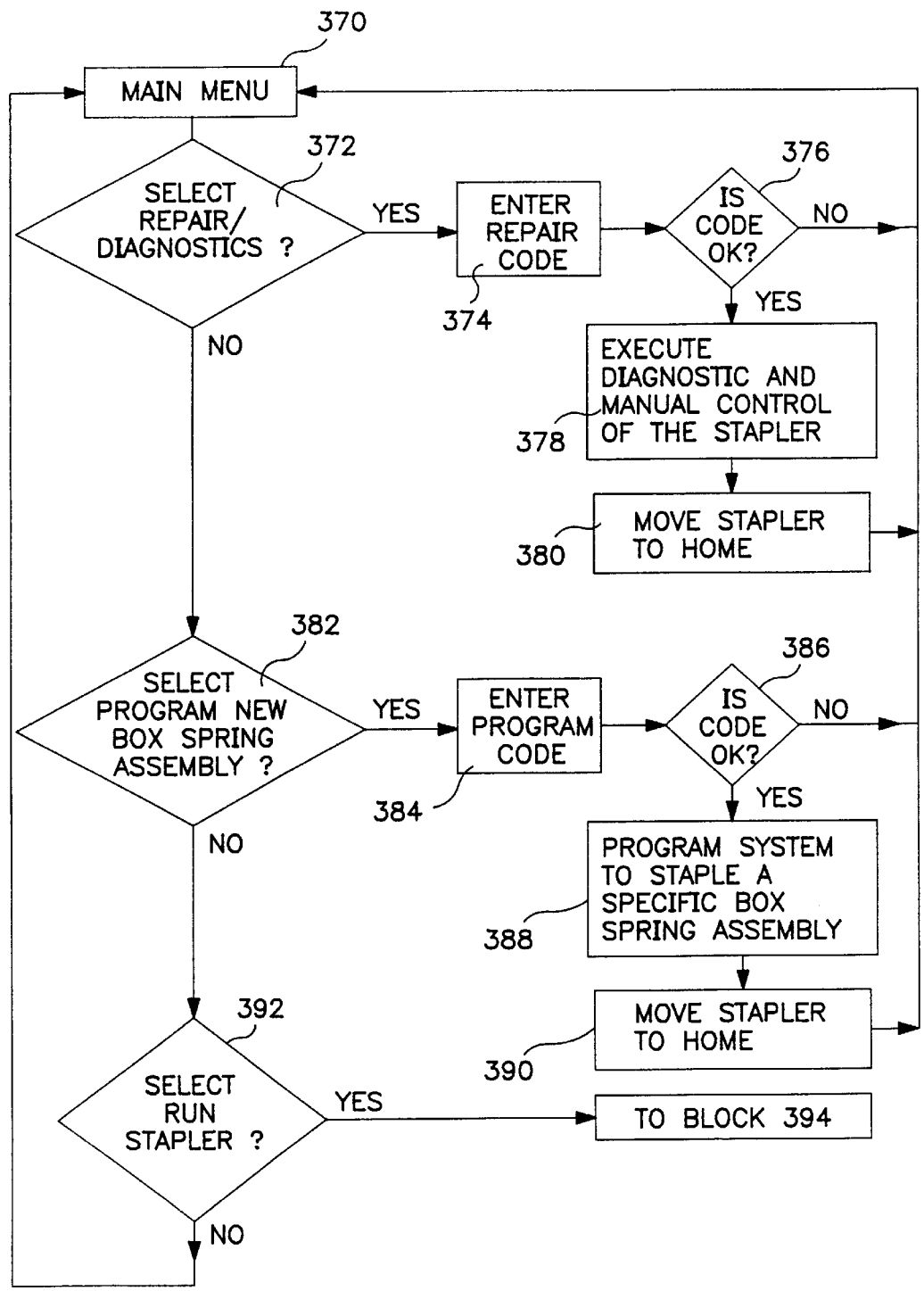
FIG. 10 is a flow chart illustrating the steps performed by a computer to provide a main menu of operations for the stapler apparatus of the present invention.
Figure 11:
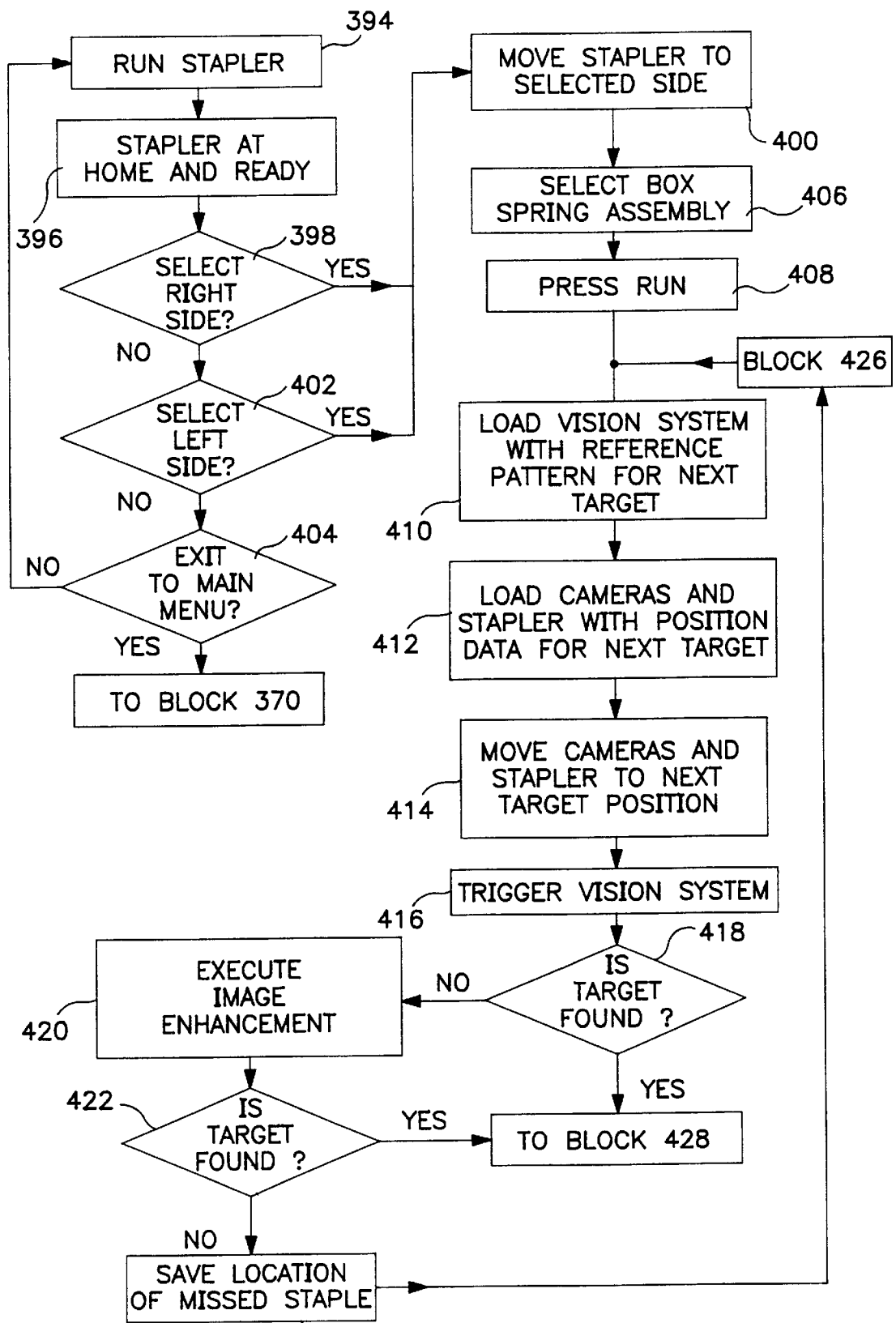
FIG. 11 is a flow chart illustrating the steps performed by the stapler apparatus during running of the stapler to secure the plurality of modules to the wooden frame.
Figure 12:
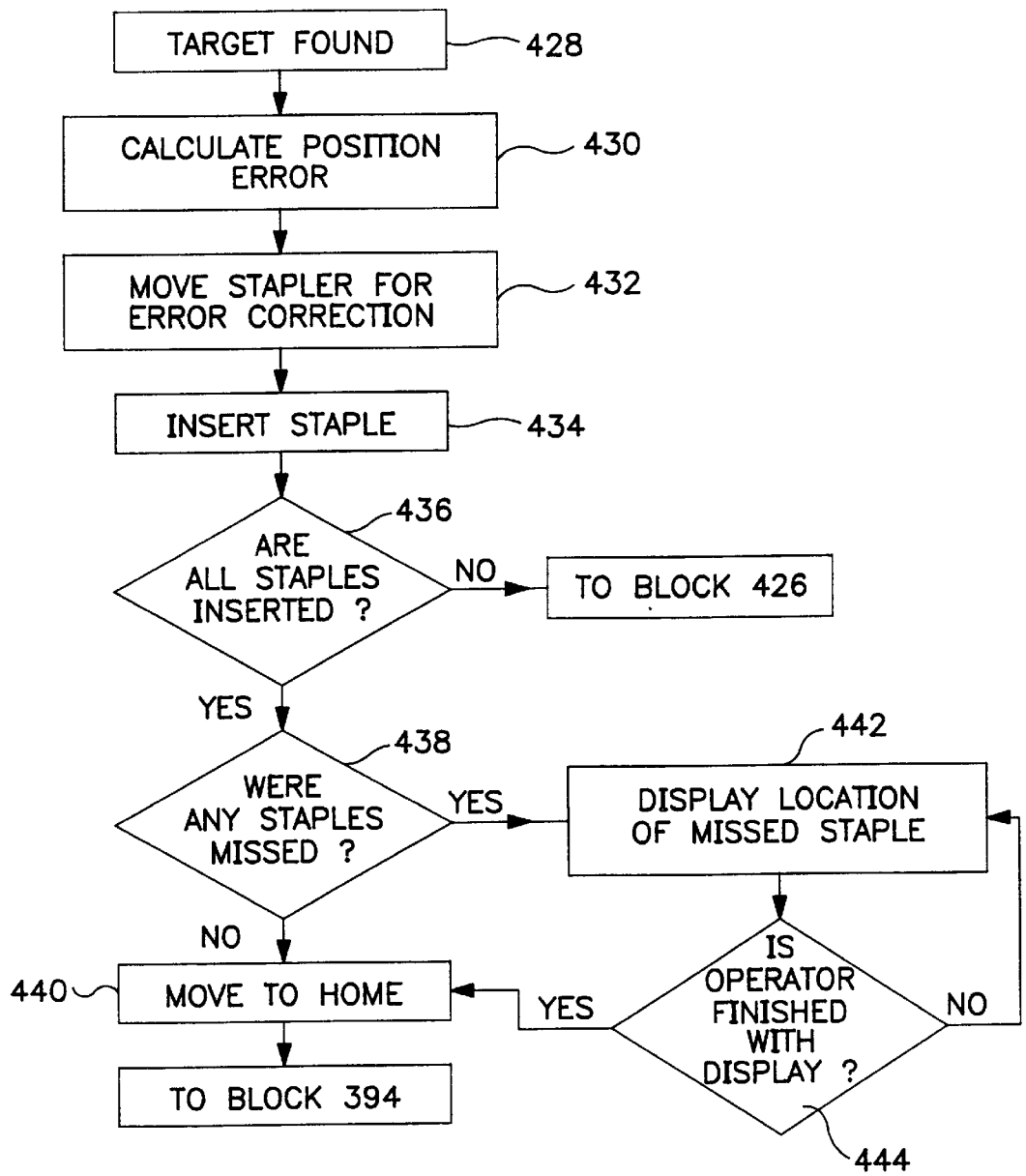
FIG. 12 is a flow chart illustrating further steps performed by the stapler apparatus to secure the modules to the wood frame.

Details of the software for controlling operation of the stapler apparatus are illustrated in FIGS. 10–12. The main menu for the stapler apparatus begins at block 370 of FIG. 10. The main menu 270 presents various options to the operator. First, computer 260 determines whether a select repair/diagnostics option has been selected as illustrated at block 372. If so, an appropriate diagnostic/repair tool is coupled to computer 260. The tool can be located at the site of computer 260 or it can be coupled to computer 260 through modem 270. The repair code is entered into computer 260 as illustrated at block 374. Computer 260 then determines whether the repair code is correct at block 376. If not, computer 260 advances back to main menu 370. If the repair code is correct, computer 260 executes diagnostic and manual control of the stapler apparatus as illustrated at block 378. Computer 260 then provides commands to move the stapler apparatus back to a home position as illustrated at block 380. Computer then advances back to block 370.

If the repair/diagnostics option was not selected at block 372, computer 260 determines whether the option for programming a new configuration for a box spring assembly was selected at block 382. If so, new program code is installed into the computer at block 384. Computer 260 checks to determine whether the code is correct at block 386. If not, computer 260 advances back to block 370. If the code entered at block 384 is correct, computer 260 programs the system to staple a specific box spring assembly as illustrated at block 388. Computer 260 then provides commands to move the stapler assembly 64 to a home position as illustrated at block 390. Computer 260 then advances back to block 370.

If the option for programming a new box spring assembly was selected at block 382, computer 260 may provide a separate listing of various types of box springs having preprogrammed known configurations. If the particular configuration of box spring has not been programmed into computer 260, the new box spring configuration must be programmed into the computer 260. The new configuration may be transmitted to computer 260 over modem 270. In addition, computer 260 may be operated in a Learn Mode. In this Mode, the wood frame 58, wire grid 60, and modules 62 are positioned on base frame 12. An operator then moves the stapler 90 to an optimum position for stapling the modules 62 to the wood frame 58 of the box spring 56. One of camera 116 or 118 is operated to store the particular pattern for the module 62 as well as a desired target location for the staple 132. Sensors on the stapler apparatus record the location for optimum stapling of the new module. Once a particular pattern of module has been stored, computer 260 is then programmed for the location of each module 62 on wood frame 58.

If the program option was not selected at block 382, computer 260 determines whether a run stapler option was selected as illustrated at block 392. If not, computer 260 returns to main menu at block 270. If so, computer 260 advances to block 394 of FIG. 11.

From block 394, computer 260 checks to make sure that stapler 64 is located at a home position and is ready for operation as illustrated at block 396. Computer 260 determines whether the right side 232 of frame 12 was selected for stapling as illustrated at block 398. If so, computer 260 sends command blocks to move the stapler apparatus 64 on upper gantry 18 to the right side 232 home position as illustrated at block 400.

If the right side frame 232 is not selected at block 398, computer 260 determines whether the left side frame 230 was selected as illustrated at block 402. If so, computer sends command blocks to move the stapler apparatus 64 on upper gantry 18 to the left side frame 230 home position as illustrated at block 400.

If the left side was not selected at block 402, computer 260 determines whether an exit to main menu option was selected as illustrated at block 404. If so, computer 260 advances to block 370 of FIG. 10. If not, computer 260 returns to block 394.

Once the appropriate frame side has been selected and the stapler apparatus 64 and upper gantry 18 are moved to the appropriate home location, the appropriate configuration of the box spring to be stapled is selected by the operator as illustrated at block 406. The operator then presses a "Run"

button to begin operation of the stapler apparatus 64 as illustrated at block 408. Computer 260 first loads the vision system with a reference image pattern for the next target module 62 as illustrated at block 410. The appropriate camera 116 or 118 is then loaded with position data for the next target as illustrated at block 412. Computer 260 then sends out command blocks to the various controllers discussed above to control movement of the cameras 116 and 118 and the stapler apparatus 64 to guide the stapler 90 to the next target position as illustrated at block 414. The vision system of the particular camera 116 or 118 is triggered using the output module 348 as illustrated at block 416. Computer 260 determines whether the desired target was found at block 418. If so, computer advances to block 428 of FIG. 12.

If the target was not found at block 418, computer 260 executes an image enhancement as illustrated at block 420. This image enhancement consists of running other algorithms that can find knots or heavy grain lines in the wood, or another type of image analysis software routine to separate and distinguish the target module from the background. Image enhancement may also include processing colored images of the target.

In other words, a simple pattern recognition technique is used at block 416. If the simple pattern recognition technique fails, then another more robust recognition software routine is executed at the block 420. Computer 260 then determines again whether the target is found as illustrated at block 422. If so, computer 260 advances to block 428 of FIG. 12. If the target is still not found, computer 260 saves the location of the missed staple as illustrated at block 424 and then advances back to block 426 of FIG. 11 to move to the next target.

If the target was found at block 418 or block 422, computer 260 moves to block 428. Using the vision signal from camera 116 or 118, computer 260 calculates a position error between the optimum module position stored in memory of the computer 260 and the actual module position read by camera 116 or 118 as illustrated at block 430. If the actual position is different from the optimum position by a predetermined amount, computer 260 will move the stapler head 98 to provide correction as indicated at block 432. The head 98 of stapler 90 includes a slot which engages the desired portion of module 62 and can then move that portion of the module 62 relative to wood frame 58 before stapling the module 62. Once the position of module 62 is corrected, if necessary, a staple 132 is inserted over the portion of module 62 and into the wood frame 58 or 238 as illustrated at block 434. Computer 260 then determines whether all the staples have been inserted for the particular box spring as illustrated at block 436. If not, computer 260 advances to block 426 of FIG. 11 to move to the next target.

If all the staples have been inserted at block 436, computer 260 determines whether any staples were missed as illustrated at block 438. If not, computer 260 returns the stapler apparatus 64 back to the home position as illustrated at block 440. Computer 260 then advances back to block 394 of FIG. 11.

If any staples were missed at block 438, computer 260 displays the location of the missed staple on the touch screen control panel 268 or the monitor 266 as illustrated at block 442. This provides a visual indication to the operator of the location of any missed staple. Computer 260 then determines whether the operator is finished with the missed staple display as illustrated at block 444. If not, computer 260 continues to display the location of any missed staples by returning to block 442. Once the operator provides an input to computer 260 indicating that the operator is finished with the display, computer 260 moves the stapler apparatus 64 to a home position at block 440 and then advances to block 394.

During the stapling process, computer 260 may display a graphic image on the control panel 268 or the monitor 266 of the box spring being stapled. Each staple first appears in a yellow color. When stapling of a particular module is complete, the dot on the display is changed to a green color indicating that a staple has been successfully inserted. If the system fails to find the location for the staple, a red colored dot will appear on the display screen to alert the operator.

Although the illustrated embodiment of the present invention includes a stapler apparatus, it is understood that another type of fastener apparatus may be used in accordance with the present invention. For instance, the apparatus may be used to install nails or other fasteners into the wood frame 58. Other tools that can be used and controlled by the apparatus and method of the present invention include a router, a water jet cutting tool, a drill, a laser cutter, a laser welder, an ultrasonic welder, etc.

In addition, a glue dispenser may be used in place of the stapler for certain applications. The glue dispenser includes a stepper motor with an air cylinder mounted on the motor shaft in a vertical position. Therefore, the motor can rotate the air cylinder. A glue dispenser tube is mounted to the top of the air cylinder shaft. The dispenser tube is connected via tubing to a glue pump. When the air cylinder extends, the dispenser arm is located above the frame.

Although the invention has been described in detail with reference to a certain preferred embodiment, variations and modifications exist within the scope and spirit of the present invention as described and defined in the following claims.

What is claimed is:

1. An apparatus for securing a plurality of modules to a frame to form a box spring, the apparatus comprising;
   a base for supporting the frame and the modules;
   a support;
   a drive mechanism coupled to the support and the base, the drive mechanism being configured to provide relative movement between the support and the base;
   a camera coupled to the support, the camera providing an image signal indicative of an actual position of the modules relative to the frame upon relative movement of the support and the base; and
   a tool coupled to the support for securing each of the modules to the frame using the image signal from the camera.

2. The apparatus of claim 1, further comprising a controller for guiding movement of the drive mechanism relative to the base and for controlling movement of the tool to secure each of the modules to the frame as the support moves relative to the frame and the modules located on the base, the controller including a memory for storing an optimum position for each of the modules on the frame relative to the base, the controller including means for guiding the tool to the stored optimum position for securing each module to the frame.

3. The apparatus of claim 2, wherein the controller receives the image signal from the camera, and the controller including means for adjusting the position of the tool from the optimum position to an actual position of the module based upon the image signal to engage the module with the tool.

4. The apparatus of claim 3, wherein the controller compares the actual position of each module to the optimum position of each module stored in the memory to generate a correction signal to adjust the position of the tool and the module before the module is secured to the frame.

5. The apparatus of claim 1, wherein the drive mechanism includes a cable drive assembly for moving the support relative to the base.

6. The apparatus of claim 1, wherein the camera is pivotably mounted to the support.

7. The apparatus of claim 6, wherein the camera pivots about 10° from an initial position aligned generally perpendicular to the base.

8. The apparatus of claim 1, wherein the tool is pivotably coupled to the support.

9. The apparatus of claim 8, wherein the tool is mounted in a gimble coupled to the support, the gimble being pivotable about a first axis and about a second axis normal to the first axis.

10. The apparatus of claim 8, wherein the tool is also rotatably coupled to the support.

11. The apparatus of claim 1, wherein the tool is movable from a retracted position to an extended position to engage a module and secure the module to the frame.

12. The apparatus of claim 1, further comprising a bottom gantry movable below the base, the bottom gantry including an alignment tool configured to position the modules on the frame.

13. The apparatus of claim 12, wherein the bottom gantry moves the alignment tool relative to the base using a cable drive mechanism.

14. The apparatus of claim 1, wherein the tool is a stapler.

15. The apparatus of claim 1, wherein the tool is a nailer.

16. The apparatus of claim 1, wherein the tool is a glue dispenser.

17. The apparatus of claim 1, further comprising first and second cameras coupled to the support on opposite sides of the tool, the first camera providing the image signal when the support is moving in a first direction, and the second camera providing the image signal when the support is moving in a second direction.

18. The apparatus of claim 17, wherein the second camera provides inspection for the tool when the support is moving in the first direction, the first camera providing inspection for the tool when the support is moving in the second direction.

19. The apparatus of claim 1, further comprising a controller for guiding movement of the drive mechanism relative to the base, the controller including means for storing an image of the module, and means for storing at least one designated tool target on the module, the controller comparing the image from the camera to the stored module image to control the drive mechanism to move the support and the tool.

20. The apparatus of claim 19, wherein the controller includes means for calculating position error of the module relative to the frame by comparing the actual image signal from the camera to the stored module image for an optimum module position.

21. The apparatus of claim 20, wherein the controller includes means for generating a control signal to move the module to the optimum module position prior to securing the module to the frame.

22. The apparatus of claim 1, wherein the base includes a first base section for supporting a first frame and a plurality of first modules, and a second base section for supporting a second frame and a plurality of second modules, the drive mechanism being configured to move the support over both the first and second base sections.

23. The apparatus of claim 1, further comprising a controller for guiding movement of the drive mechanism relative to the base and for controlling movement of the tool to secure each of the modules to the frame, and further comprising a modem coupled to the controller for accessing the controller from a remote location.

24. A method for securing a plurality of modules to a frame to form a box spring, the method comprising the steps of:

providing a base for supporting the frame and the modules;

providing a tool for securing the modules to the frame;

storing an image of an optimum position for each of the modules on the frame relative to the base;

providing relative movement between the tool and the base to move the tool to the optimum position for each module;

generating an image signal using a camera to indicate an actual position of each module relative to the frame;

comparing the optimum position of the module to the actual position of the module;

adjusting the position of the tool based on the comparing step; and securing the module to the frame.

25. The method of claim 24, further comprising the steps of storing a plurality of different optimum positions in the memory corresponding to a plurality of different frame and module configurations, and selecting a particular frame and module configuration based upon the actual frame and module configurations that are located on the base.

26. The method of claim 24, further comprising the step of determining whether the module should be moved by the tool relative to the frame based on the comparing step before the tool secures the module to the frame in the securing step.

27. The method of claim 24, further comprising the step of aligning the modules on the frame substantially in the optimum position prior to the securing step.

28. The method of claim 24, wherein the step of providing relative movement between the camera and the tool and the base includes the step of moving both the camera and the tool on a support over the frame and the modules located on the base.

29. An apparatus for securing a module to a frame, the apparatus comprising:

a base for supporting the frame and the modules;

a support including a track extending across the frame;

a first drive mechanism coupled to the support and the base, the first drive mechanism being configured to move the support along a first axis over the base;

a fastener assembly including a plate movably coupled to the track of the support for movement along a second axis which is generally perpendicular to the first axis, a gimble pivotably coupled to the plate about both the first axis and the second axis, and a tool coupled to the gimble for movement about a longitudinal axis for securing the module to the frame;

a second drive mechanism coupled between the support and the plate for moving the plate along the second axis relative to the support;

a third drive mechanism coupled between the plate and the gimble for pivoting the gimble about the first axis;

a fourth drive mechanism coupled between to the plate and the gimble for pivoting the gimble about the second axis;

a fifth drive mechanism coupled to the tool for moving the tool up and down along its longitudinal axis; and a controller coupled to and configured to actuate the first, second, third, fourth, and fifth drive mechanisms for guiding movement of the support, the plate, the gimble, and the tool to secure the module to the frame.

30. The apparatus of claim 29, further comprising a camera coupled to the support, the camera providing an image signal indicative of an actual position of the module relative to the frame upon movement of the support relative to the base.

31. The apparatus of claim 30, wherein the controller includes means for storing an optimum position of each module relative to the frame, means for moving the tool to the optimum position, means for comparing the optimum position to the actual position of the module based on the image signal from the camera, and means for adjusting the position of the tool to engage the module.

* * * * *